United States Patent
Tai et al.

(10) Patent No.: US 7,035,993 B2
(45) Date of Patent: Apr. 25, 2006

(54) FLASH MEMORY DATA ACCESS METHOD AND CONFIGURATION EMPLOYING LOGICAL-TO-VIRTUAL AND VIRTUAL-TO-PHYSICAL SECTOR MAPPING

(75) Inventors: Shih-Chieh Tai, Taoyuan Hsien (TW); Chien-Hung Wu, Tainan (TW)

(73) Assignee: SimpleTech, Inc., Santa Ana, CA (US)

( * ) Notice: Subject to any disclaimer, the term of this patent is extended or adjusted under 35 U.S.C. 154(b) by 102 days.

(21) Appl. No.: 10/063,278

(22) Filed: Apr. 8, 2002

(65) Prior Publication Data
US 2003/0135688 A1 Jul. 17, 2003

(30) Foreign Application Priority Data
Jan. 11, 2002 (TW) ................ 91100279 A

(51) Int. Cl.
*G06F 12/10* (2006.01)
(52) U.S. Cl. ....................... 711/206; 711/103
(58) Field of Classification Search .............. 711/156, 711/103, 111, 202; 365/185.01, 185.11, 365/185.29, 185.33
See application file for complete search history.

(56) References Cited

U.S. PATENT DOCUMENTS

| | | | |
|---|---|---|---|
| 5,297,148 A | 3/1994 | Harari et al. | |
| 5,404,485 A * | 4/1995 | Ban .......................... | 711/202 |
| 5,479,638 A | 12/1995 | Assar et al. | |
| 5,602,987 A | 2/1997 | Harari et al. | |
| 5,611,067 A | 3/1997 | Okamoto et al. | |
| 5,799,168 A | 8/1998 | Ban | |
| 5,818,781 A | 10/1998 | Estakhri et al. | |
| 5,907,856 A | 5/1999 | Estakhri et al. | |
| 5,930,815 A * | 7/1999 | Estakhri et al. .............. | 711/103 |
| 5,937,425 A | 8/1999 | Ban | |
| 5,946,714 A * | 8/1999 | Miyauchi ..................... | 711/205 |
| 5,963,983 A * | 10/1999 | Sakakura et al. ........... | 711/202 |
| 5,991,517 A | 11/1999 | Harari et al. | |
| 6,034,897 A | 3/2000 | Estakhri et al. | |
| 6,040,997 A | 3/2000 | Estakhri | |
| 6,134,151 A | 10/2000 | Estakhri et al. | |
| 6,141,249 A | 10/2000 | Estakhri et al. | |
| 6,145,051 A * | 11/2000 | Estakhri et al. .............. | 711/103 |
| 6,148,354 A | 11/2000 | Ban et al. | |
| 6,149,316 A | 11/2000 | Harari et al. | |
| 6,172,906 B1 | 1/2001 | Estakhri et al. | |

(Continued)

*Primary Examiner*—Hong Chong Kim
*Assistant Examiner*—Shane M. Thomas
(74) *Attorney, Agent, or Firm*—Seyed Jalal Sadr

(57) ABSTRACT

A flash memory configuration and access method having a particular conversion method that uses the page or the sector in each flash memory block instead of the block that is commonly used as the base of the data conversion storage to store data. When data is written into the physical flash block of the flash memory, the original logic sector information can be preserved. The data is written into the same block of the flash memory in a manner according to the sequence as it is received instead of the sequence of the logic sector. Therefore, the block position does not move to refresh the block content until the physical block is full. Consequently, the number of times to move the physical block of the flash memory can be reduced to increase the lifetime of the flash memory. Moreover, since the number of times to erase is reduced, so that the writing speed can speed up to improve the operation efficiency.

8 Claims, 9 Drawing Sheets

U.S. PATENT DOCUMENTS

| | | |
|---|---|---|
| 6,202,138 B1 | 3/2001 | Estakhri et al. |
| 6,262,918 B1 | 7/2001 | Estakhri et al. |
| 6,282,624 B1 * | 8/2001 | Kimura et al. .............. 711/202 |
| 6,374,337 B1 | 4/2002 | Estakhri |
| 6,397,314 B1 | 5/2002 | Estakhri et al. |
| 6,414,876 B1 | 7/2002 | Harari et al. |
| 6,477,616 B1 * | 11/2002 | Takahashi ................... 711/111 |
| 6,732,221 B1 | 12/2002 | Ban |
| 6,523,132 B1 | 2/2003 | Harari et al. |
| 6,678,785 B1 | 4/2003 | Lasser |
| 6,684,345 B1 | 5/2003 | Harari et al. |
| 6,839,826 B1 | 8/2003 | Cernea |
| 6,732,222 B1 | 5/2004 | Garritsen et al. |
| 2002/0004878 A1 * | 1/2002 | Norman ...................... 711/103 |

\* cited by examiner

# FLASH MEMORY DATA ACCESS METHOD AND CONFIGURATION EMPLOYING LOGICAL-TO-VIRTUAL AND VIRTUAL-TO-PHYSICAL SECTOR MAPPING

CROSS REFERENCE TO RELATED APPLICATIONS

This application claims the priority benefit of Taiwan application serial no. 91100279, filed Jan. 11, 2002.

BACKGROUND OF INVENTION

1. Field of Invention

The present invention generally relates to a flash memory data access method and a configuration employing the same, and more particularly, to an access method that is able to reduce the number of times of the flash memory block writing and a configuration employing the same.

2. Description of Related Art

Storage devices such as the hard disk or the soft disk drive are commonly used in computers as the mass storage device to store data. However, no matter whether hard disk or soft disk drive, a motor is mandatory to rotate the magnetic material to a specific location to store the data that is to be saved. If this kind of storage device is applied to the portable computers that are widespread used currently, the portable computer suffers not only from great power consumption of the batteries by the storage device, but also failure or even malfunction of the storage device caused by vibration.

Therefore, in order to meet the requirements of being light, thin, short and small as well as being portable, applying the solid state memory to the mass storage device will be a great choice because this kind of storage device does not have the problems mentioned above. Consequently, many related techniques for using the solid state memory to replace the rotating magnetic media had been proposed. All of these can be used to solve the problems mentioned above. Moreover, in these non-volatile memories, it is generally recognized that the flash memory related technique is the most mature art to replace the rotating magnetic media mentioned above to be the mass storage memory device, And so it is also the most probable candidate in the short term to replace the rotating magnetic media as the computer mass storage memory.

Furthermore, accompanying the development of related electronic products, the demand of portable electronic devices for flash memory has increased gradually. For example, the most popular electronic devices, such as the digital camera or the personal digital assistant (PDA), or even the mobile phone, need to use a large amount of mass storage media. However, since all the portable electronic devices mentioned above have the characteristic design of light, thin, short and small, the non-volatile memory is the only choice, and so flash memory is the most popular and most widespread memory product.

However, flash memory has its own limitations. Since flash memory is composed of a transistor memory cell, and the data access is performed via electron tunneling or erasing to achieve the operation of data saving or data erasing, a large current passes through the dielectric layer on the sideway of the floating gate electrode. Hence, all this kind of the memory has the limitation of a fixed number of erasing and writing times. That is, after a certain number of erasing and writing times, the memory cell will fail or malfunction. Moreover, the flash memory vendors all set the number of the erasing and writing times in such memory from 100 thousand to 1 million. Consequently, how to reduce the number of the erasing and writing times to increase the flash memory lifetime becomes a very important technology development trend.

Since the speed of the erasing operation is relatively slow, the memory operation efficiency can be significantly improved if the number of the erasing and writing times can be reduced.

SUMMARY OF INVENTION

Therefore, the present invention provides a flash memory configuration and access method having a particular conversion method that uses the page or the sector in each flash memory block, instead of the block that is commonly used, as the base of the data conversion storage to store data. When data is written into the physical flash block of the flash memory, the original logic sector information can be preserved. The data is written into the same block of the flash memory in a manner according to the sequence it is received instead of the sequence of the logic sector. Therefore, the block position does not move to refresh the block content until the physical block is full. Consequently, the number of times to move the physical block of the flash memory can be reduced to increase the lifetime of the flash memory. Moreover, since the number of times to erase is reduced, the writing speed can speed up to improve the operation efficiency.

To achieve the objective mentioned above, the present invention provides a flash memory data access method, suitable for the data access between a host and a flash memory. The host sequentially accesses data by using a plurality of logic elements that are stored in a logic portion. Moreover, the flash memory has a physical portion, wherein the physical portion comprises a plurality of physical elements that are used to store data. The method of the present invention comprises a unit management device that is used to provide a conversion configuration, comprising a first conversion table and a second conversion table. The first conversion table is used to store a virtual element that corresponds to each logic element and a virtual unit that the virtual element locates. The second conversion table is used to store a physical element of the physical portion that corresponds to each virtual element, and a physical unit of the physical portion that corresponds to each virtual unit. Moreover, the physical unit comprises a plurality of the physical elements. Afterwards, the host sequentially accesses data from the logic element mentioned above, wherein the first conversion table mentioned above is referenced to convert each logic element to the corresponding virtual element and the virtual unit that the virtual element locates. Corresponding to the virtual unit, the second conversion table mentioned above is referenced to convert each virtual unit to the corresponding physical unit, and to convert the virtual element to the corresponding physical element. Wherein, the physical elements and the physical units that are converted via the logic elements mentioned above by the unit management device are sequentially accessed according to the sequence in the physical portion.

To achieve the objective mentioned above, the present invention provides a flash memory data access method, suitable for the data access between a host and a flash memory. The host mentioned above sequentially accesses data by using a plurality of logic elements that are stored in a logic portion. Moreover, the flash memory has a physical portion, wherein the physical portion comprises a plurality of physical elements that are used to store data. The method mentioned above comprises providing a first conversion table and a second conversion table. The first conversion table mentioned above is used to store a virtual element that corresponds to each logic element and a virtual unit that the virtual element locates. The second conversion table mentioned above is used to store a physical element of the physical portion that corresponds to each virtual element, and a physical unit of the physical portion that corresponds to each virtual unit. Moreover, the physical unit comprises a plurality of the physical elements. Then, the host sequentially accesses data from the logic element, wherein the first conversion table is referenced to convert each logic element to the corresponding virtual element and the virtual unit that the virtual element locates. Afterwards, corresponding to the virtual unit, the second conversion table is referenced to convert each virtual unit to the corresponding physical unit, and to convert the virtual element to the corresponding physical element. Wherein, the physical elements and the physical units that are converted via the logic element by the unit management device are sequentially accessed according to the sequence in the physical portion.

In the data access method and the configuration of the flash memory mentioned above, the logic unit is a logic sector, the virtual unit is a virtual sector, and the physical unit is a physical sector. The logic sector is a protocol between the host and the flash memory specified by an LBA mode of the ATA protocol.

Moreover, in the data access method and the configuration of the flash memory mentioned above the sequence of the physical portion that is used to sequentially access data is the sequence of the physical sector and the physical element in the flash memory. That is, the sequence used to sequentially access data is from the physical sector of the LSB (Least Significant Bit) in the flash memory to the physical sector of the MSB (Most Significant Bit) in the flash memory, and from the physical element of the LSB (Least Significant Bit) in the flash memory to the physical element of the MSB (Most Significant Bit) in the flash memory.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings, FIG. 1 schematically shows the block diagram of the electronic device and the non-volatile memory device of a preferred embodiment according to the present invention.

DETAILED DESCRIPTION

The present invention provides a configuration and an access method that can be applied to a flash memory mass storage device. A special conversion method used for the data access uses the page or the sector in each flash memory block, instead of the commonly used block, as the base of the data conversion storage to store data. When data is written into the physical flash block of the flash memory, the original logic sector information can be preserved. The data is written into the same block of the flash memory in a manner according to the sequence as it is received instead of the sequence of the logic sector. Therefore, the block position does not move to refresh the block content until the physical block is full.

The unit management device (abbreviated as UMD hereafter) is a system utilized by the particular conversion method of the present invention, designed by deploying the characteristics of the flash memory to achieve the objective of effectively improving the data access efficiency. The flash memory is characterized as follows: 1. The erase unit is a block, 2. The basic unit of read/write is exactly a page, and 3. The write operation only allows conversion from 1→0 or 0→0, but does not allow conversion from 0→1, and a page is exactly the basic unit of the ATA protocol that is a 512 Bytes sector. Therefore, if the flash memory is mapped directly with a one-to-one mapping method by using the host LBA mode of the preferred embodiment according to the present invention, a block needs to be erased when a page is modified. Therefore, the operation efficiency is significantly reduced.

That is, if the flash memory is to be used as a mass storage device, the configuration and the access method of the present invention can be utilized. In such a special conversion method, the page or the sector in each flash memory block, instead of the block, that is commonly used, is used as the base of the data conversion storage to store data. When data is written into the physical flash block of the flash memory, the original logic sector information can be preserved. The data is written into the same block of the flash memory in a manner according to the sequence it is received instead of the sequence of the logic sector. Therefore, the block position does not move to refresh the block content until the physical block is full. Consequently, the number of times to move the physical block of the flash memory can be reduced to increase the lifetime of the flash memory. Moreover, since the number of times to erase is reduced, the writing speed can speed up to improve the operation efficiency.

Figure 1:
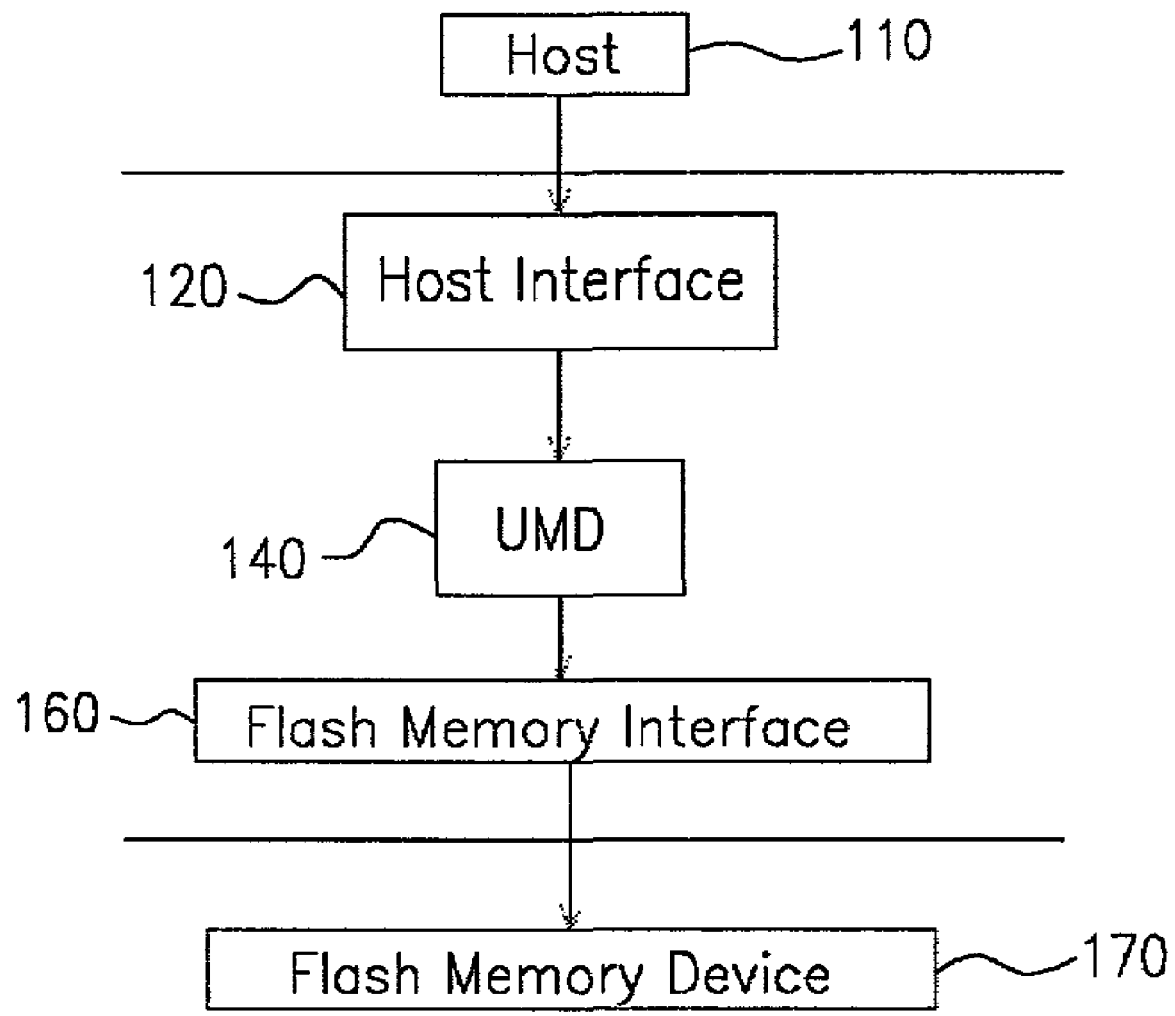

FIG. 1 schematically shows the block diagram of the electronic device and the non-volatile memory device of a preferred embodiment according to the present invention. The electronic device comprises a host 110 and a peripheral device, the peripheral device comprises a host interface 120, a unit management device (UMD) and a flash memory interface 160. The flash memory device 170 is the device for host 110 to store the mass storage data.

The electronic device mentioned above is not limited to the personal computer; portable computer, personal digital assistant (PDA), digital camera, any electronic equipment that utilizes this kind of the non-volatile memory device can be also be applied. The present invention further is suitable for the current ATA specification. ATA (AT Attachment) is the mostly used industrial standard. ATA is used to define the command protocol or the transmission standard between the host and the storage device. The vendor command set is defined by each vendor for the specific function of their specially designed product.

In the past, the mass storage device of the host 110 utilized two modes that are defined by the ATA protocol. One is the CHS mode, composed of cylinder, head and sector. The traditional hard disk soft disk drive all belong to this type of application. The other mode is the LBA mode that is composed of the logic sector (represented as LS hereafter). The utilization of the non-volatile memory belongs to this type of application. The conversion of the CHS mode and the LBA mode is represented as following equation: LS= ((Cylinder+1)×Mac(Head)+Head+1)×(number of Sector of each Cylinder)+Sector 1

The Cylinder, Head and Sector of the above equation is a specific storage position under the CHS mode, when it is converted to the LBA mode, it is a corresponding LS value.

Figure 2:
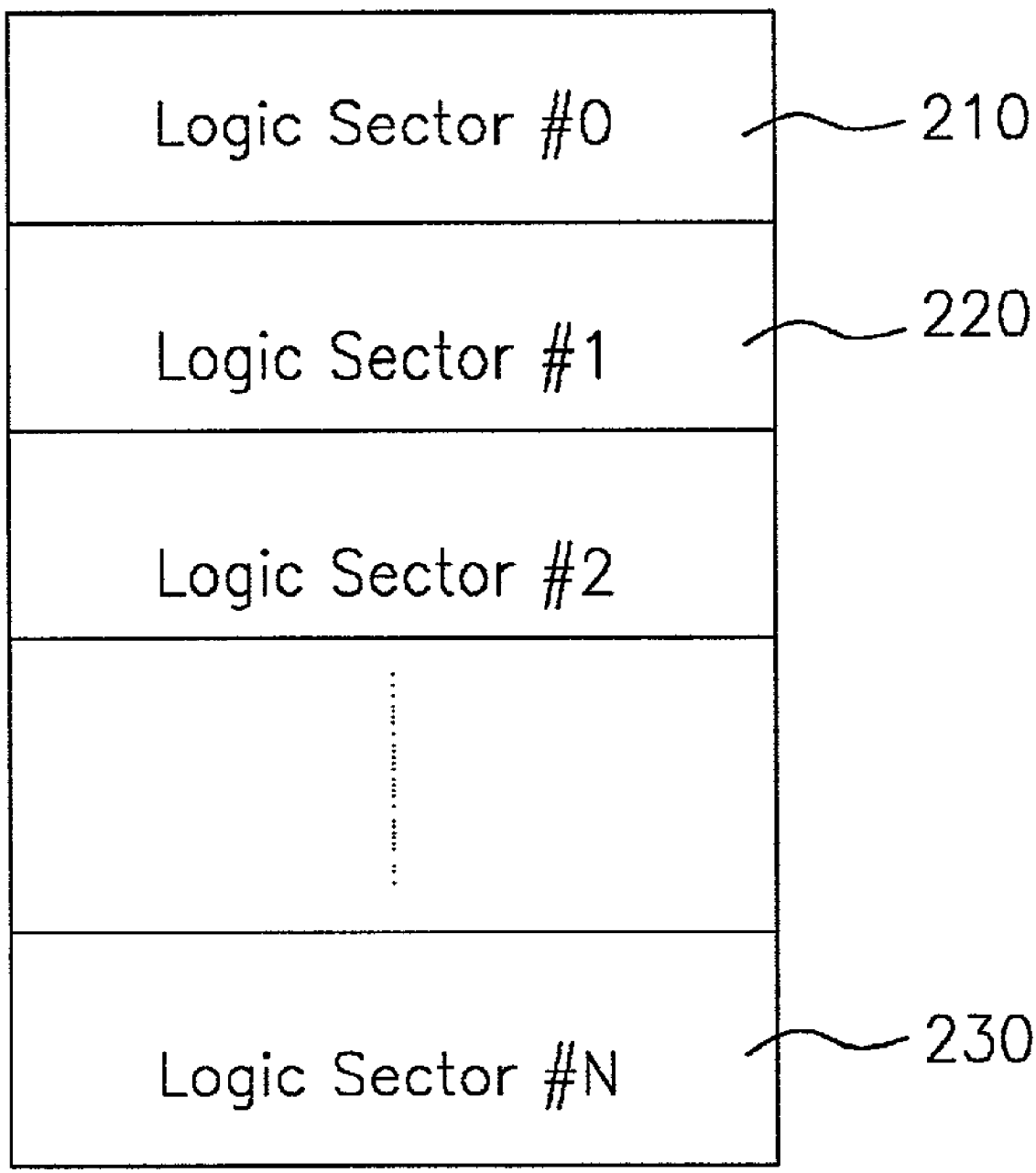
FIG. 2 schematically shows the LBA mode flash memory logic sector of a preferred embodiment according to the present invention for host data accessing.

Therefore, if the electronic device intends to apply the flash memory device 170 for the storage, then for the sake of compatibility, the flash memory device 170 is a continuous storage medium when it is seen from the host 110 side. In general, every sector has 512 Bytes as the logic sector 210, 220 to 230 (Logic Sector #0~Logic Sector #N) shown in FIG. 2.

The host 110 performs an access operation to the flash memory device 170 via the flash memory interface 160 by using the conversion that is performed by the unit management device (UMD) 140 and using the ATA command set 120. The flash memory interface 160 is used to provide the basic command set of the flash memory.

The unit management device (UMD) 140 is the unit utilized by the particular conversion method of the present invention. The unit management device (UMD) 140 is designed by deploying the characteristics of the flash memory. Generally speaking, the flash memory is characterized as follows: 1. The erase unit is a block, 2. The basic unit of read/write is exactly a page,3. The write operation only allows conversion from 1→0 or 0→0, but does not allow conversion from 0→1, and a page is exactly a basic unit of the ATA protocol that is a 512 Bytes sector. Therefore, if the flash memory is mapped directly with a one-to-one mapping method by using the host LBA mode of the preferred embodiment according to the present invention, a block needs to be erased when a page is modified. Therefore, the operation efficiency is significantly reduced.

The unit management device (UMD) 140 provides a conversion method from the host 110 side to the physical memory device to improve the operation efficiency and increase the reliability of data access. The method comprises the sector management and the block management, the major intention is to: 1. reduce the number of times to erase the block, 2. fully utilize the flash write busy time (it is generally about 200_nanoseconds) and the erase busy time (it is at most about 3 msec) of the flash memory, and 3. exchange the burst write time of the host 110 with the space. The detailed conversion method is introduced in detail hereafter accompanied with the drawings. The conversion method is also described accompanied with the configuration as shown in FIG. 1.

Figure 3:
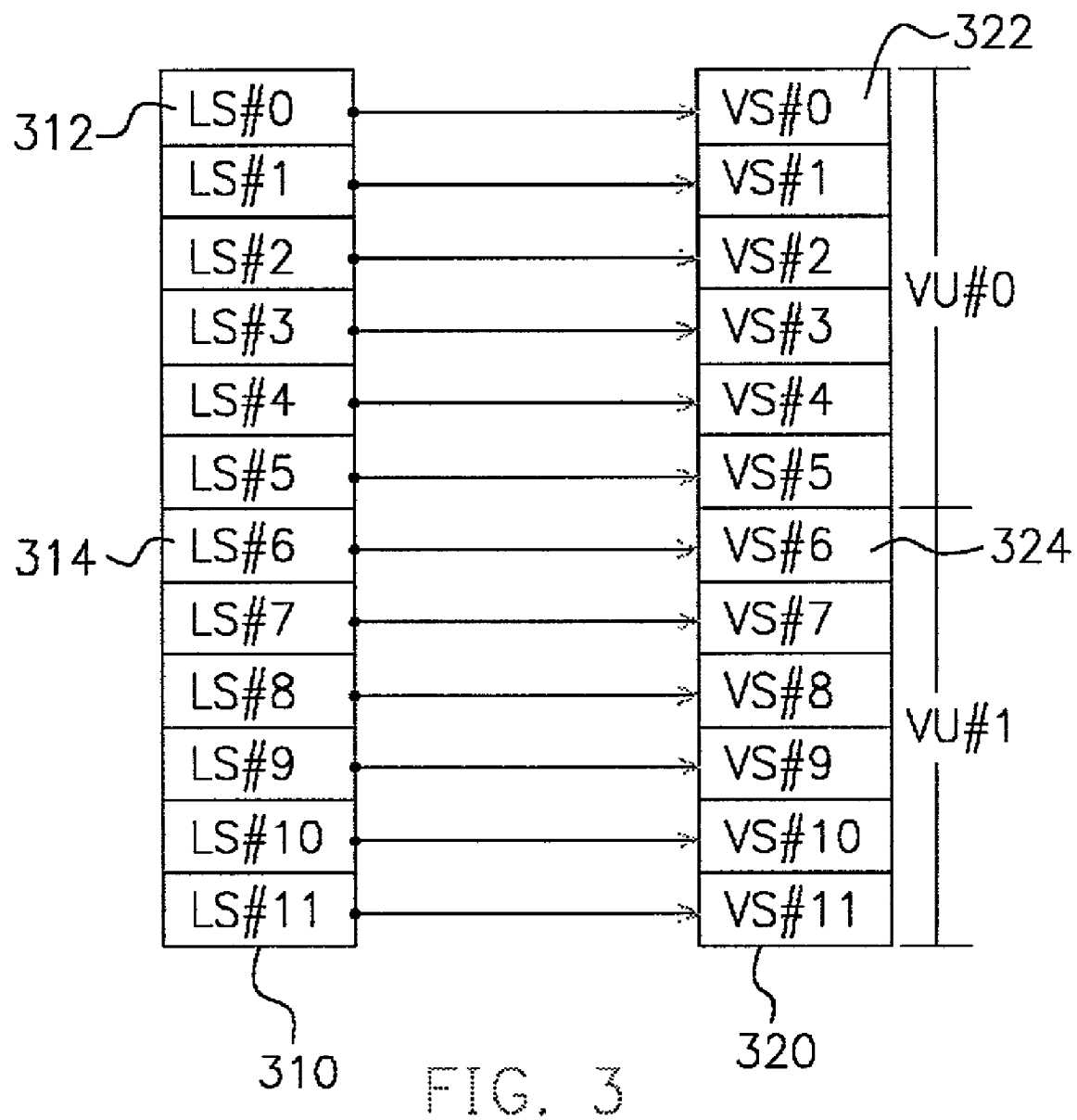
FIG. 3 shows when the host shown in FIG. 1 accesses the data in the flash memory device by using the LBA mode logic sector, the data is sequentially accessed according to the number of the logic sector.

Please refer to FIG. 3. When the host 110 accesses the data in the flash memory device 170 by using the logic sector (LS) of the LBA mode, the data is sequentially accessed according to the LS number of the logic sector such as the twelve logic sectors LS#0~LS#11 shown in the diagram. Although only the twelve logic sectors are exemplified in the present diagram, according to the spirit of the present invention, a different number of the logic sectors can also be applied to the present invention. The case shown in the diagram only serves as an example and does not limit the application of the present invention. When the host 110 sequentially accesses the data in the flash memory device 170 according to the sequence of the logic sectors, the unit management device (UMD) 140 of the present invention provides a conversion configuration to allow the host 110 to sequentially access data accurately by using the logic sector of the LBA mode. Moreover, the conversion configuration allows the flash memory device 170 to efficiently reduce the number of times to erase block and write block to increase the lifetime of the flash memory device 170.

The sequence of the logic sector portion 310 that provides the data access for the host 110 is the logic sector 0~11 (LS#0~LS#11 as shown in the diagram). The sequence of the virtual portion 320 is the virtual sector 0~11 (VS#0~VS#11 as shown in the diagram). The virtual unit (represented as VU hereafter and in the drawing) is further added to the virtual portion 320. The virtual unit VU has the corresponding virtual sector VS, the total number of virtual sectors VS depends on the design. As shown in the diagram, each virtual unit VU has six virtual sectors VS. The logic sector LS number corresponds one-to-one to the virtual sector VS. For example, the logic sector LS 312 having number #0 corresponds to the virtual sector VS 322 having number #0, the logic sector LS 314 having number #6 corresponds to the virtual sector VS having number #6.

The virtual unit VU number that corresponds to each virtual sector VS is the quotient of the virtual sector VS number divided by the total number of the virtual sector VS owned by each virtual unit VU. For example, the virtual sector VS 322 having number #0 corresponds to the virtual unit having number #0, the virtual sector VS 324 having number #6 corresponds to the virtual unit having number #1 (6(virtual sector number)/6(each virtual unit has 6 virtual sectors)=1). That is, the number of the corresponding virtual unit is #1.

Figure 4:
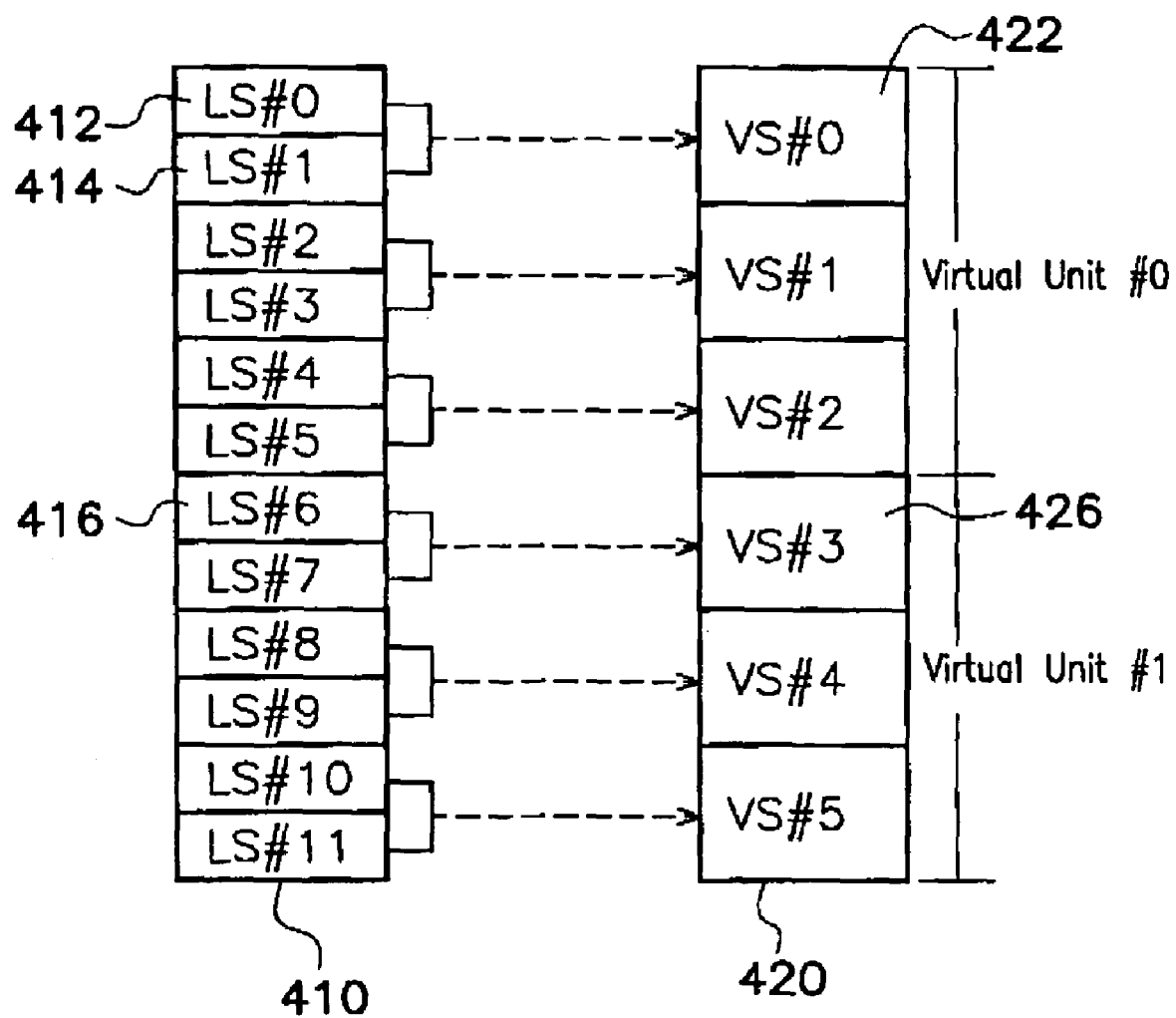
FIG. 4 schematically shows another preferred embodiment in which the logic sector portion is converted to the virtual portion.

FIG. 4 schematically shows another preferred embodiment by which another logic sector portion 410 is converted to the virtual portion 420. The difference between this case and the previous case is that the logic sector LS number does not correspond one-to-one to the virtual sector VS number, instead two logic sectors correspond to one virtual sector in this case. For example, the logic sector LS 412 having number #0 and the logic sector LS 414 having number #1 all correspond to the virtual sector VS 422 having number #0, the logic sector LS 416 having number #6 corresponds to the virtual sector VS having number #3. The corresponding method is that the virtual sector number equals to the quotient of the logic sector number divided by 2.

The virtual unit number that corresponds to each virtual sector is the same as the virtual unit number in the previous case. That is, the virtual unit number is the quotient of the virtual sector number divided by the total number of the virtual sectors owned by each virtual unit. In the present case, each virtual unit has 3 virtual sectors. For example, the virtual sector VS 422 having number #0 corresponds to the virtual unit having number #0, the virtual sector VS 426 having number #3 corresponds to the virtual unit having number #1 (3(virtual sector number)/3(each virtual unit has 3 virtual sectors)=1). That is, the number of the corresponding virtual unit is #1.

From FIG. 3 and FIG. 4 mentioned above, the present invention first utilizes the virtual portion to allow the host 110 to sequentially read data according to the sequence of the logic sector LS number.

Figure 5:
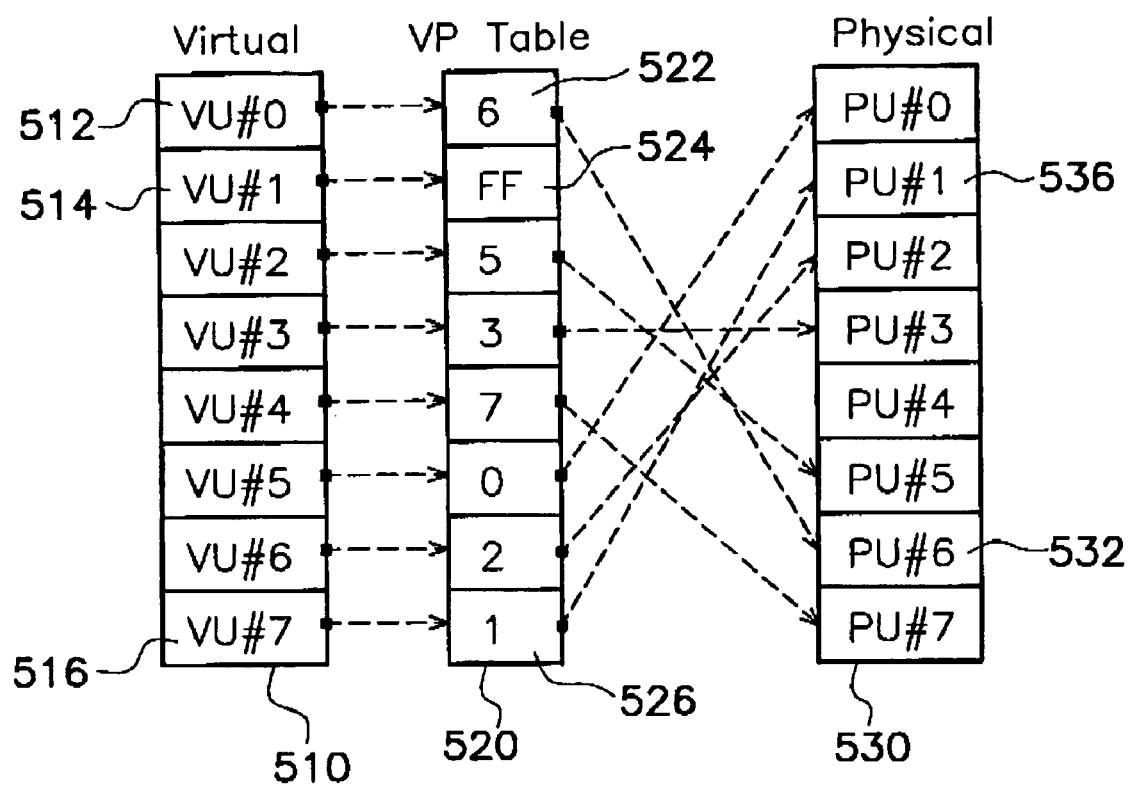
FIG. 5 schematically shows the method of a preferred embodiment according to the present invention that converts the virtual portion to the physical portion.

FIG. 5 schematically shows how a preferred embodiment according to the present invention converts the virtual portion 510 to the physical portion 530. The physical portion 530 is located in the physical deployed address of the flash memory device 170 in FIG. 1. Generally speaking, the physical address of the flash memory 170 can be divided into the physical unit (represented as PU hereafter and in the drawings) and the physical sector (represented as PS hereafter and in the drawings). The present invention provides a virtual to physical table (represented as VP table hereafter and in the drawings) 520 as the mapping table to convert the virtual address to the physical address.

For example, in FIG. 5, for the virtual unit 512 having number #0 in the virtual portion 510, the corresponding address 522 in the virtual to physical table (the VP table shown in the diagram) stores a value of 6, and the physical unit it maps to is the physical unit (PU) 532 having number #6 in the physical portion 530. To the virtual unit 514 having number #1 in the virtual portion 510, the corresponding address 524 in the virtual to physical table 520 stores a value of FF, where FF indicates this virtual unit 514 has not been allocated to any physical unit yet, in other words, the data stored in the virtual unit 514 is "00". For the virtual unit 516 having number #7 in the virtual portion 510, the corresponding address 526 in the VP table 520 stores a value of 1, and the physical unit it maps to is the physical unit (PU) 536 having number #1 in the physical portion 530. The mapping logic mentioned above indicates that the physical unit number equals to the virtual unit number in the VP table.

Figure 6:
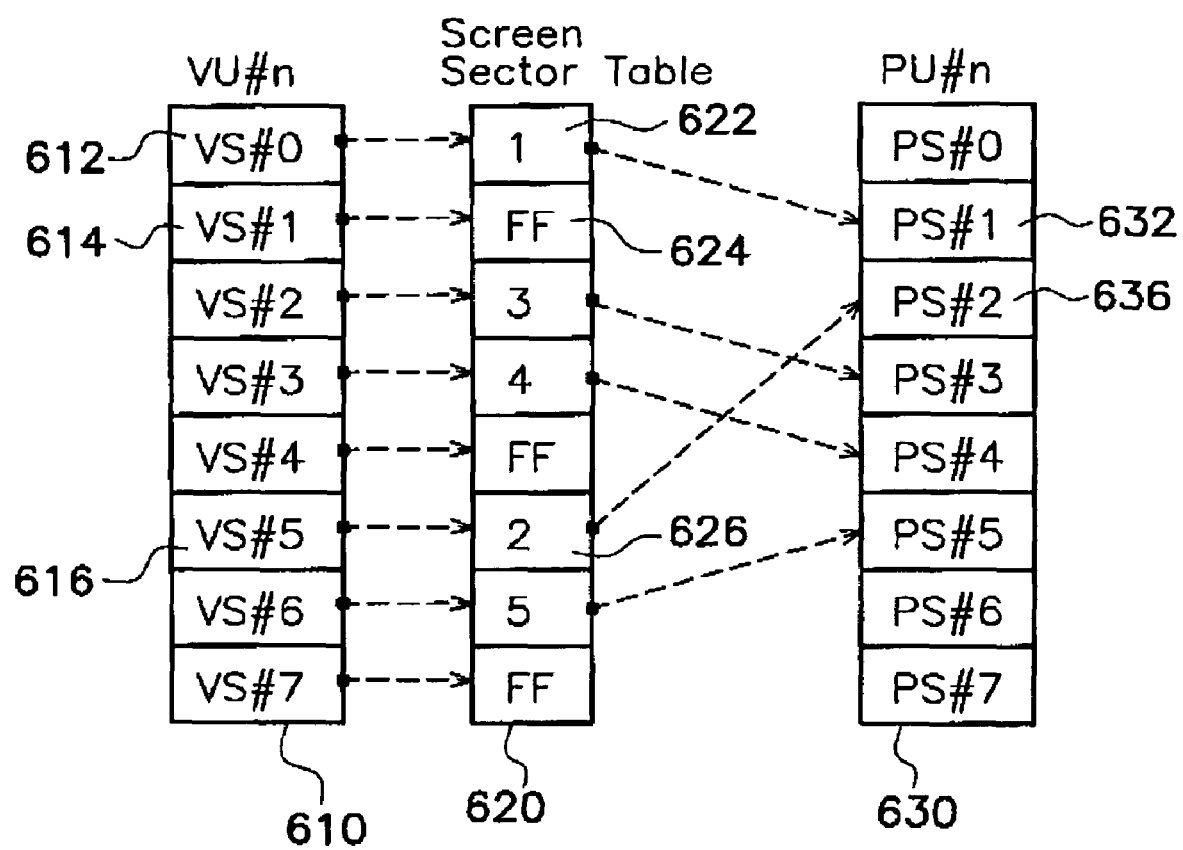
FIG. 6 schematically shows the method of a preferred embodiment according to the present invention that converts the virtual sector to the physical sector.

FIG. 6 schematically shows the method of a preferred embodiment according to the present invention for converting the virtual sector to the physical sector. The present invention provides a screen sector table 620 as a mapping table to convert the virtual sector to the physical sector. For example, in FIG. 6, for the virtual sector 612 having number #0 in the virtual portion 610, the corresponding address 622 in the screen sector table 620 stores a value of 1, the physical sector it maps to is the physical sector (PS) 632 having number #6 in the physical portion 630. For the virtual sector 614 having number #1 in the virtual portion 610, the corresponding address 624 in the screen sector table 620 stores a value of FF, where FF indicates this virtual sector 614 has not been allocated to any physical sector yet, in other words, the data stored in the virtual sector 614 is "00". For the virtual sector 616 having number #5 in the virtual portion 610, the corresponding address 626 in the screen sector table 620 stores a value of 2, and the physical sector it maps to is the physical sector (PS) 636 having number #2 in the physical portion 630. The mapping configuration mentioned above indicates the physical sector number equals to the virtual sector number in the screen sector table.

The physical portion of the flash memory device 170 in FIG. 1 is physically composed of a memory unit or an array that constitutes several memory units, and the size of the physical portion matches the memory size that design demands. The total number of blocks of each memory unit depends on different products provided by vendors. Generally speaking, the total number of pages in a block varies depending on the size and the total number of blocks of the flash memory device 170. For example, the Toshiba flash memory model TC58V64 has a size of 64 MegaBits (represented as Mbits hereafter) and 1024 blocks, so that each block has 16 pages. Moreover, the Toshiba flash memory model TC58128 has a size of 128 Mbits and 1024 blocks, and therefore, each block has 32 pages.

For the general flash memory, when the operation is in a busy time period, no operation can be performed to the flash memory. Moreover, the period of busy time is not a short period, for example, the reading operation time is about 25 nanoseconds, the writing operation time is about 200 nanoseconds, and the erasing operation time is about 3 msec. Therefore, distributing the blocks of the physical portion to different memory units is generally used to increase the operation efficiency of the flash memory, and this method is defined by using an interleave value. For example, if the interleave value is equal to 1, it indicates each block in the physical unit points to the same memory unit. If the interleave value is equal to 2, it indicates each block in the physical unit points to different memory unit. That is, in order to improve the operation efficiency, the physical unit of the physical portion physically distributes the blocks into different memory units, so that the limitation of no operation due to busy time can be avoided.

Figure 7:
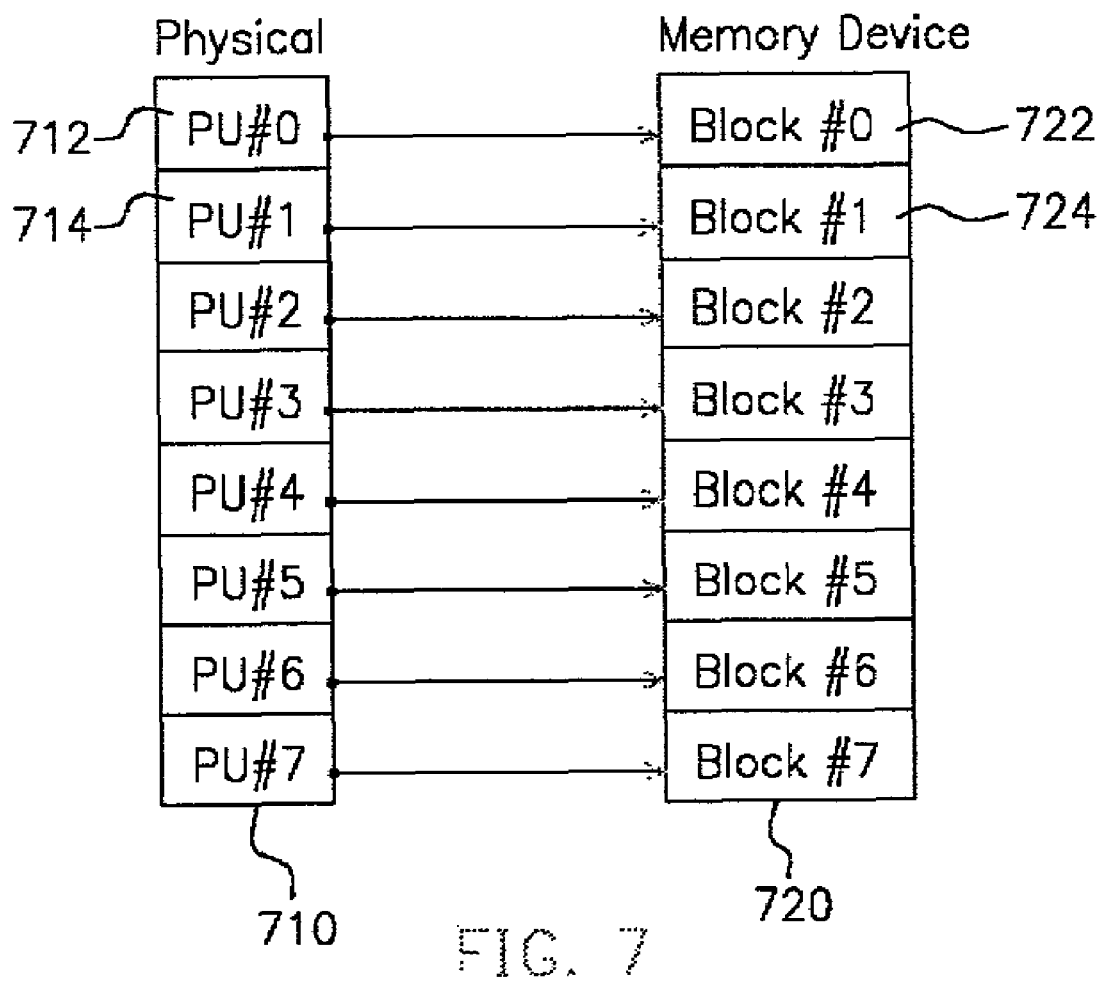
FIG. 7 schematically shows the preferred embodiment in which the physical unit (PU) number corresponds to the block number in the flash memory device.
Figure 8:
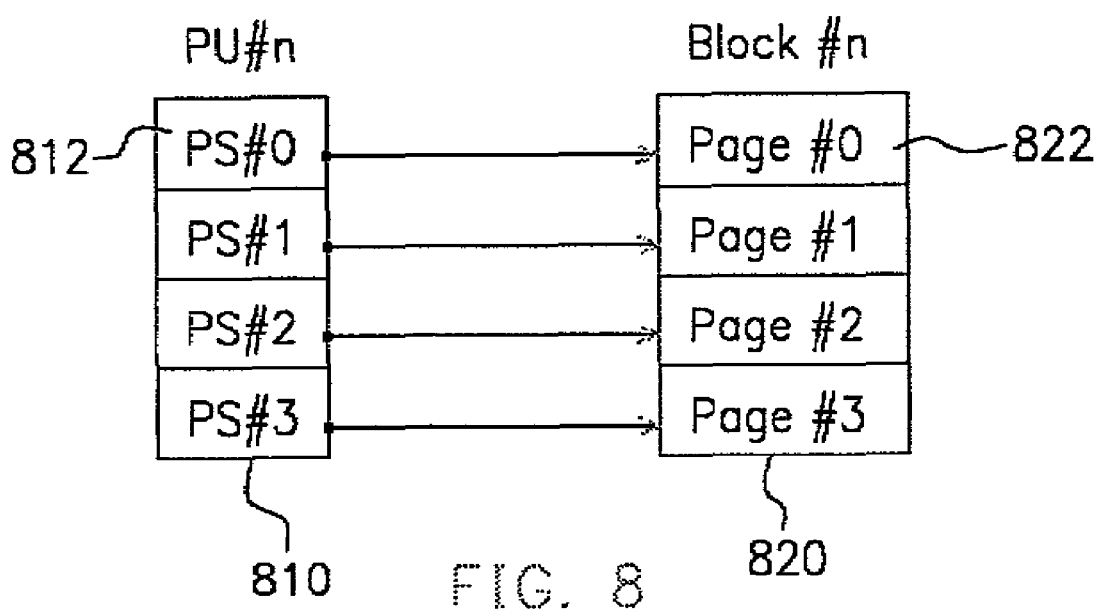
FIG. 8 schematically shows the method by which the physical sector (PS) in a specific physical unit (PU#n) corresponds to the page in the specific block (Block#n)

The physical portion of the flash memory device 170 shown in FIG. 1 under the situation where the interleave value is equal to 1 is shown in FIG. 7. FIG. 7 schematically shows the preferred embodiment in which the physical unit (PU) number corresponds to the block number in the flash memory device 170. Moreover, FIG. 8 schematically shows the method in which the physical sector (PS) in a specific physical unit (PU#n) corresponds to the page in the specific block (Block#n).

In FIG. 7, for example, the physical unit 712 having number #0 in the physical portion 710 corresponds to the block 722 having number #0 in the flash memory device 720 or 170 in FIG. 1. The physical unit 714 having number #1 in the physical portion 710 corresponds to the block 724 having number #1 in the flash memory device 170. For example, the physical sector PS#0 812 having number #0 in the $n^{th}$ physical unit (PU#n) 810 as shown in FIG. 8 corresponds to the page (Page #0) 822 having number #0 of the Block #n 820.

Figure 9:
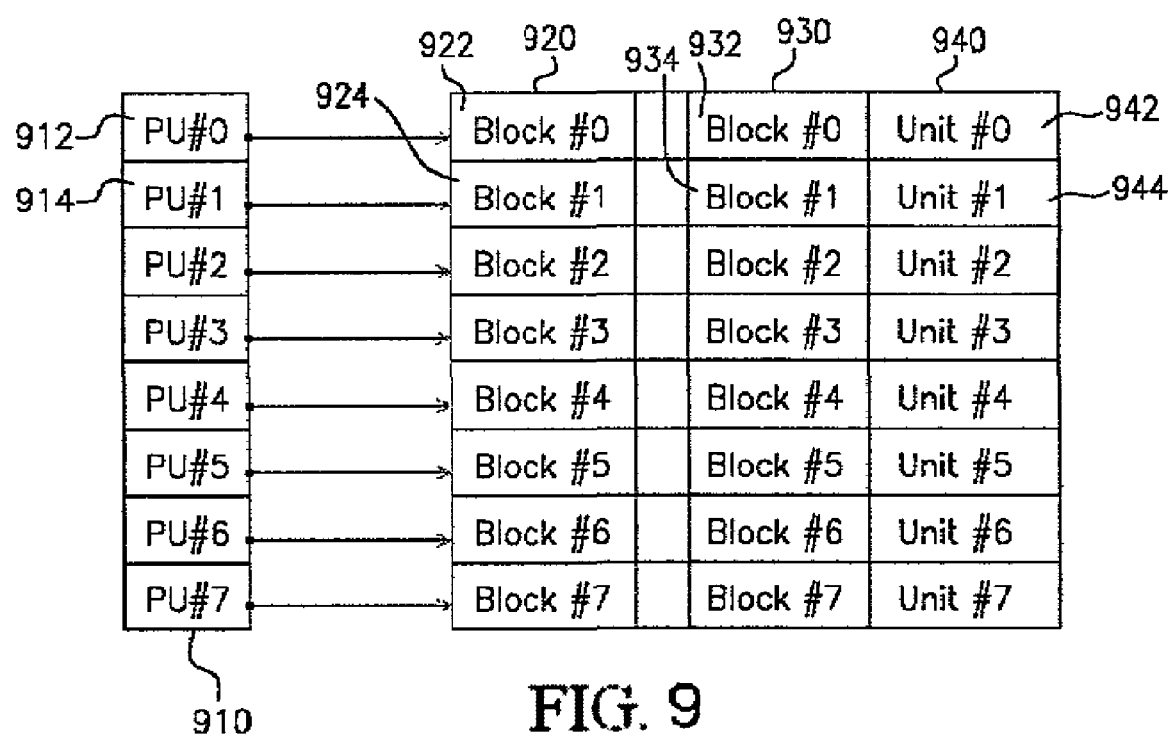
FIG. 9 schematically shows the preferred embodiment in which the physical unit (PU) number corresponds to the block number in the memory device.
Figure 10:
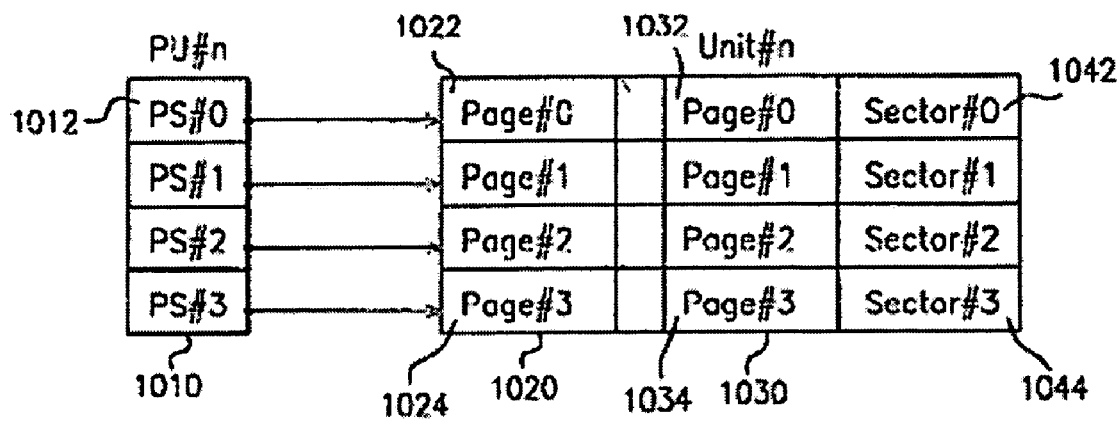
FIG. 10 schematically shows the method by which the physical sector (PS) in a specific physical unit (PU#n) corresponds to the page in the specific unit (Unit#n)
Figure 11:
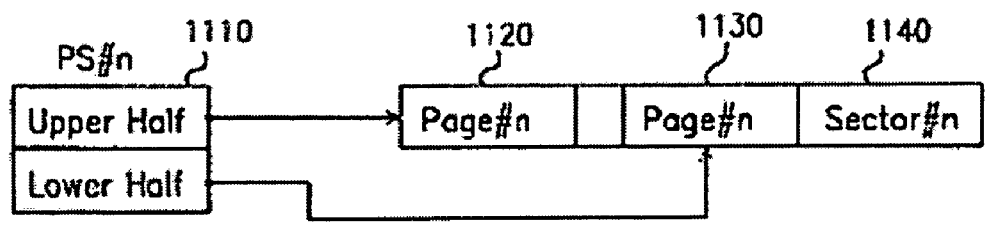
FIG. 11 schematically shows the method by which each physical sector is divided into upper half and lower half, and each half corresponds to the page in different memory unit

The physical portion of the flash memory device 170 shown in FIG. 1 under the situation of the interleave value equals to 2 is shown in FIGS. 9, 10 and 11. FIG. 9 schematically shows the preferred embodiment in which the physical unit (PU) number corresponds to the block number in the memory device 170. FIG. 10 schematically shows the method in which the physical sector (PS) in a specific physical unit (PU#n) corresponds to the page in the specific unit (Unit#n). FIG. 11 schematically shows the method in which each physical sector (PS) is divided into upper half and lower half, and each half corresponds to the page in a different memory unit.

In FIG. 9, for example, the physical unit 912 having number #0 of the physical portion 910 corresponds to the block 922 having number #0 that belongs to the first memory unit 920 and the block 932 having number #0 that belongs to the second memory unit 930. Both block 922 and block 932 belong to the unit 942 having number #0 in the third memory unit 940. The physical unit 914 having number #1 of the physical portion 910 corresponds to the block 924 having number #1 that belongs to the first memory unit 920 and the block 934 having number #1 that belongs to the second memory unit 930. Both block 924 and block 934 belong to the unit 944 having number #1.

For example, the physical sector (PS#0) 1012 having number #0 in the $n^{th}$ physical unit (PU#n) 1010 as shown in FIG. 10 corresponds to the page 1022 having number #0 that belongs to the first memory unit 1020 and the page 1032 having number #0 that belongs to the second memory unit 1030. Both page 1022 and page 1032 belong to the sector 1042 having number #0. The physical sector (PS#3) 1024 having number #3 corresponds to the page 1024 having number #3 that belongs to the first memory unit 1020 and the page 1034 having number #3 that is belonged to the second memory unit 1030. Both page 1024 and page 1034 belong to the sector 1044 having number #3. As shown in FIG. 11, when each physical sector (PS) is divided into upper half and lower half, when the interleave value equals to 2, the upper half corresponds to a specific page in the first memory unit, and the lower half corresponds to another specific page in the second memory unit. The upper half of the physical sector having number #n (PS#n) as shown in the diagram corresponds to the page having number #n (Page#n) 1120 in the first memory unit. The lower half corresponds to the page having number #n (Page#n) 1130 of the second memory unit. Both pages all belong to the sector 1140 having number #n.

The present invention provides a conversion method from the host side to the physical memory device by using the unit management device (UMD) as shown in FIG. 1 to improve the operation efficiency and increase the reliability of data access. The method is composed of sector management and block management. The major intention is to reduce the number of times to erase block, and to fully utilize the characteristic that the flash memory can operate during the flash write busy time and the erase busy time to improve the operation efficiency. Furthermore, the present invention uses space to increase the host burst write time.

When the host accesses data in the flash memory device by using the LBA mode logic sector (represented as LS hereafter), the data is sequentially accessed according to the logic sector LS number. The unit management device (UMD) of the present invention provides a conversion configuration to allow the host to sequentially access data accurately by using the logic sector of the LBA mode. Moreover, the conversion configuration allows the flash memory device to efficiently reduce the number of times to erase block and write block to increase the lifetime of the flash memory device.

In summary, the configuration and the access method of the present invention can be applied to the flash memory as a mass storage device. The special conversion method of the present invention uses the page or the sector in each flash memory block instead of the block that is commonly used as the base of the data conversion storage to store data. When data is written into the physical flash block of the flash memory, the original logic sector information can be preserved. The data is written into the same block of the flash memory in a manner according to the sequence as it is received instead of the sequence of the logic sector. Therefore, the block position does not move to refresh the block content until the physical block is full.

The configuration mentioned above can be further applied to the current super size flash memory device. For example, the Giga bits flash memory such as the product of model TH58100FT provided by Toshiba Japan, Inc. strictly demands that all pages within the same block must be programmed from the LSB (Least Significant Bit) page to the MSB (Most Significant Bit) page. This super size flash memory device specially requests to prohibit using the randomly page access method. The present invention meets this kind of specification completely.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

The invention claimed is:

1. A flash memory data access method, for data access between a host and a flash memory device, wherein the host sequentially accesses data by using a plurality of logical elements stored in a logical portion, wherein the host writes data to the flash memory device by providing the plurality of logical elements, and the flash memory device includes a physical portion, wherein the physical portion comprises a plurality of physical elements for storing data, wherein the method comprises:

mapping logical elements of the logical portion to virtual elements of a virtual portion of the flash memory device;

creating a virtual-to-physical (VP) table, which maps virtual units of the virtual portion to physical units of the physical portion; and creating a screen element table if the logical elements provided by the host are out of sequence, wherein the screen element table maps the virtual elements in each one of the virtual units to the physical elements of a physical unit corresponding to the virtual unit, wherein the screen element table has a table data structure, wherein the VP table and the screen element table exist in separate tables, wherein, if the logical elements provided by the host are in sequence, the logical elements requested by the host are mapped to physical elements via the VP table by unit, wherein, if the logical elements provided by the host are out of sequence, the logical elements requested by the host are mapped to physical elements first via the VP table by unit and subsequently via the screen element table by element, and wherein an empty physical element of the physical elements is written in response to a request from the host.

2. The flash memory data access method of claim 1, wherein a logical element is a logical sector, a virtual element is a virtual sector, and a physical element is a physical sector.

3. The flash memory data access method of claim 2, wherein the logic sector is translated between the host and the flash memory prescribed by LBA (Logical Block Addressing) mode of the ATA (Advanced Technology Attachment) protocol.

4. The flash memory data access method of claim 2, wherein a write sequence on the physical elements accesses the empty physical element via the screen element table in a different sequence than a write sequence of the logical elements requested by the host.

5. A flash memory data access method, for data access between a host and a flash memory device, wherein the host sequentially accesses data by using a plurality of logical elements stored in a logical portion, wherein the host writes data to the flash memory device by providing the plurality of logical elements, the flash memory device includes a physical portion, wherein the physical portion comprises a plurality of physical elements to store data, wherein the method comprises:

mapping logical elements of the logic portion to virtual elements of the virtual portion;

creating a virtual-to-physical (VP) table, which maps virtual units of the virtual portion to physical units of the physical portion;

creating a screen element table if the logical elements provided by the host are out of sequence, wherein the screen element table maps the virtual elements in each one of the virtual units to physical elements of the physical unit corresponding to the virtual unit; and sequentially accessing the data according to a sequence of the logical elements requested by the host, wherein the screen element table has a table data structure, wherein the VP table and the screen element table exist in separate tables, wherein, if the logical elements provided by the host are in sequence, the logical elements requested by the host are mapped to physical elements via the VP table by unit, wherein, if the logical elements provided by the host are out of sequence, the logical elements requested by the host are mapped to physical elements first via the VP table by unit and subsequently via the screen element table by element, and wherein an empty physical element of the physical elements is written in response to the sequence of the logical elements requested from the host.

6. The flash memory data access method of claim 5, wherein a logical element is a logical sector, a virtual element is a virtual sector, and a physical element is a physical sector.

7. The flash memory data access method of claim 6, wherein the logical sector is translated between the host and the flash memory prescribed by LBA (Logical Block Addressing) mode of the ATA (Advanced Technology Attachment) protocol.

8. The flash memory data access method of claim 6, wherein a write sequence on the physical elements accesses the empty physical element via the screen element table in a different sequence than a write sequence of the logical elements requested by the host.

* * * * *